United States Patent
Zwick et al.

(10) Patent No.: US 6,613,174 B1
(45) Date of Patent: Sep. 2, 2003

(54) PROCESS FOR THE MANUFACTURE OF AN ACOUSTICALLY EFFECTIVE FOIL STACK FOR A VEHICLE HEAT SHIELD

(75) Inventors: Evelyn Zwick, Ebmatingen (CH); Alexander Wildhaber, Walenstadt (CH)

(73) Assignee: Rieter Automotive (International) AG, Zollikon (CH)

( * ) Notice: Subject to any disclaimer, the term of this patent is extended or adjusted under 35 U.S.C. 154(b) by 85 days.

(21) Appl. No.: 09/617,240

(22) Filed: Jul. 14, 2000

(30) Foreign Application Priority Data

Apr. 17, 2000 (CH) .................................. 0756/00

(51) Int. Cl.⁷ ............................ B31F 1/22; A01J 21/00; B21B 31/00
(52) U.S. Cl. .................... 156/209; 72/6.2; 72/28.2; 72/30.2; 72/199; 72/363; 72/366.2; 425/363; 425/372
(58) Field of Search ................... 264/165, 167, 264/241, 299; 425/237, 328, 335, 337, 363, 372; 156/196, 207, 209, 333, 292, 494, 538; 72/6.2, 28.2, 30.2, 199, 225, 226, 363, 366.2, 379.2

(56) References Cited

U.S. PATENT DOCUMENTS 5,778,717 A * 7/1998 Berger et al. ................ 72/205
6,042,530 A * 3/2000 Bohn et al. ................ 493/436

FOREIGN PATENT DOCUMENTS

DE 4329411 A1 * 5/1994
EP 0439046 A1 * 7/1991

* cited by examiner

Primary Examiner—Donald J. Loney
(74) Attorney, Agent, or Firm—Nath & Associates PLLC; Marvin C. Berkowitz; Jerald L. Meyer

(57) ABSTRACT

The method and the device for manufacturing an acoustically effective foil stack (9) made of embossed foil webs (5e, 5f, 5g, 5h) is characterised by the fact that at least two foil webs lying over one another (5a, 5b, 5c, 5d) are embossed at the same time, are conveyed along different length conveying routes (W, W1, W2, W3), and then are brought together into a stack (9), and embossed foil webs (5e, 5f, 5g, 5h) arranged to be lying next to one another are laid down in an offset fashion due to the different length conveying routes (W, W1, W2, W3). A particularly advantageous-design of the embossing rollers (1a, 1b) provides foil webs which have knobs with a draped or folded type structure.

10 Claims, 2 Drawing Sheets

PROCESS FOR THE MANUFACTURE OF AN ACOUSTICALLY EFFECTIVE FOIL STACK FOR A VEHICLE HEAT SHIELD

BACKGROUND OF THE INVENTION

The invention relates to a method of manufacturing a stack of embossed foil webs for a vehicle heat shield, a stack manufactured by this process, and a device for the manufacture of a stack of this kind.

Foil stacks of this kind are used, for example, as heat or as sound insulation, and consist of several profiled foil sheets lying on top of one another, for instance made of non ferrous metals, in particular of aluminium. The stacks described in the following are used preferably in the motor vehicle industry, in particular as sound absorbing insulation packs or as heat shields for vehicles.

For the manufacture of stacks of this kind, flat or sheet material is passed through a pair of embossing rollers, of which in general one of the rollers has the desired structure, whilst the other either has an elastic surface or is provided with a complementary structure (negative structure). The structuring/embossing of the flat material is combined with local stretching or elongation of the flat material. Examples of structuring of flat or sheet materials done in such a way are sufficiently well known to the specialist. This structuring or embossing can be in the form of knobs, corrugations or diamond shapes.

Sound absorbing insulation packs or heat shields, which are used, in particular, in vehicle or motor vehicle construction, generally consist of several structured flat or sheet materials arranged on top of one another, especially in the form of embossed foils or metal sheets. The structured flat materials for creating an insulating effect are designed in such a way that air or gas volumes can form between the individual layers and contact between the layers arranged on top of one another is avoided over a large area. The individual sheets should therefore be as far apart from one another as possible. In order to achieve considerable embossing depths, the distances between the individual deformations are increased, which, however, leads to a reduction in bending strength and compression resistance. This kind of deformation of flat materials leads, therefore, to the disadvantage that the structured flat material is easily pressed back together again even at low surface pressure, which can occur, for example, by unintentional or undesirable pressing actions, and hence the insulation effect is lost. The low compression resistance of these structure flat materials is due both to the low number of deformations per surface unit (in the following also referred to as structural density, or knob or corrugation density) and also to the low thickness of the structured flat materials caused by the extension or stretching during embossing. As a consequence of the reduced structural density and the locally reduced material thickness, these flat materials have an inadequate rigidity for their intended purpose in the area of individual deformations (knobs, corrugation crests and depressions). This leads to the fact that with known knobbed flat materials, for example, the individual knobs can be pressed flat again or deformed even under slight pressure. Furthermore, these structured flat materials have a low overall bending strength, as they have a low compression resistance and low rigidity in the area of the individual knobs.

DE - 43 '29 '411 describes a heat and sound insulation material made of several profiled foils, the said foils having a corrugated profile formed from parallel corrugation crests and depressions, with gussets folded into the depressions. However, practice has shown that these foil packs only meet the expectations of the motor vehicle industry in part. In addition, it has proved that the rigidity in the area of the individual corrugation crests and depressions is not adequate for the use referred to above.

With the process for manufacturing foil stacks known today, a foil web is passed through a pair of rollers and the foil web, thus embossed, is cut into sections, which are laid or stacked on top of one another. Processes are also known where several pairs of rollers are used at the same time, and the embossed foil webs are passed over one another and cut together. With all these processes it may happen that the embossed foils become interlocked in one another, i. e., the individual embossings come to lie exactly over one another and the individual foils therefore slot into one another (in a similar way to a stack of egg boxes). This means that the individual foils are not at a distance from one another in the intended way, but lie instead closely on top of one another.

From the printed publication EP 0 439 046 A1, a process and a device for the manufacture of a foil stack is known, where several embossing rollers are used. This manufacturing process also proves to be exceedingly complex and is correspondingly cost intensive. In order to be able to change the structure of the foils or the flat or sheet material, with this device a large number of embossing rollers must be exchanged.

In the following the concept of "foil web" will be used to include all types of sheet metal, flat or sheet material. The concept "sheets" is to be used to all types of stacked sheet metal, flat or sheet material which is cut from the processed foil webs. It is a matter of course that this material in the form of a web may consist of processed paper, suitable plastics or metal, unperforated or perforated foils, thin metal leaf or metal sheets, for example. These materials can also be layered and/or have slight deformation patterns, perforations or fissures.

An essential task of this invention is to create a cost effective process and a device for the manufacture of an insulation pack for vehicle heat shields, which has a good heat insulation effect and good sound absorption. Furthermore, this insulation pack is to have a high bending strength and high compression resistance.

A further task of this invention is to create an embossed foil web which does not have the disadvantages of the known foil webs. In particular, it is the task of this invention to create a foil web which has increased rigidity and, in particular, increased bending strength and higher compression resistance.

It is also a task of this invention to create a stack made of embossed foil webs, the said stack being suitable for use as a sound absorbing vehicle heat shield, and where the individual sheets of the said stack are certain to remain lying at a distance from one another. In particular, the task is to create a stack which has increased bending strength and higher compression resistance.

SUMMARY OF THE INVENTION

The task is solved by a method of manufacturing a stack made of embossed foil webs for a vehicle heat shield, where at least two unembossed foil webs are conveyed from a feed device in a conveying direction and are embossed, in particular knobbed, between at least one pair of embossing rollers, and the embossed foil webs are then brought together to form a stack in a stacking device wherein the embossed foil webs arranged next to one another are conveyed along different conveying routes with the aid of a conveying device in such a way that at least two embossed foil webs arranged next to one another in the stack are in the conveying direction due to the differences in length of the various conveying routes.

Preferably (including advantageously) the unembossed foil webs lying over one another are embossed by a single pair of embossing rollers. Preferably the embossed foil webs lying on top of one another are embossed with at least two different embossing patterns, including a first embossing pattern and a second embossing pattern. Preferably the first and second embossing patterns in the conveying direction are essentially structured to be of the same length, and that the embossed foil webs are guided along different length conveying routes in such a way that two foil webs arranged next to one another in the stack have a different embossed pattern.

It is preferred that the unembossed foil webs lying on top of one another are overstretched in a predetermined way during embossing, so that the embossed foil webs are provided with deformations, in particular knobs, with a draped or folded type structure, and fissures are preferably created.

A device according to the invention for manufacturing a stack made of embossed foil webs for a vehicle heat shield, includes a feed device for several unembossed foil webs, at least one pair of embossing rollers arranged to follow the feed device in a conveying direction for embossing the unembossed foil webs, which are arranged to lie over one another, and a stacking device arranged to follow this, for bringing together the embossed foil webs, whereas a conveying device is arranged between the at least one pair of embossing rollers and the stacking device, for creating different route lengths for the individual embossed foil webs in such a way that, due to the length differences of the various conveying routes the embossed foil webs arranged next to one another are offset in the conveying direction.

Preferably at least one embossing roller of the pair of embossing rollers has at least a first embossing pattern and a second embossing pattern.

A stack made of embossed foil webs for a vehicle heat shield according to the invention has neighbouring foil webs which have a different or parallel offset embossed pattern.

The stack preferably is such that the individual, embossed foil webs show deformations, in particular knobs, the said deformations having a draped or folded type structure.

Preferably the individually embossed foil webs have fissures.

The task set is solved by the invention with a process for the manufacture of a stack made of embossed foil webs. At least two unembossed foil webs are drawn from a feed device and are embossed between at least one pair of embossing rollers, and in particular are knobbed. The foil webs thus knobbed or embossed are then brought together in a stacking device into a stack. This stacking device also includes a cutting tool, in order to cut the foil webs which have been brought together into a desired length. According to the invention, a conveying device is provided between the pair of embossing rollers and the stacking device, with the aid of which the embossed foil webs are conveyed along various conveying routes. This conveying device is designed in such a way that at least two embossed foil webs arranged next to one another have to cover different routes before they are fed to the stacking device. Due to the differences in length of the various routes the embossed patterns on the various foil webs are offset to one another before the stacking device. In a preferred design form of the process as described in the invention, the foil webs are provided with different embossed patterns. Here individual knobs are embossed on the web which have a draped or folded structure. This draped or folded structure means that the individual knobs have a greater compression resistance and the whole foil web has higher bending strength. With this process it is also possible to create fissured foil webs, which are more acoustically effective than unfissured foil webs.

This process has the advantage that the webs made of flat or sheet material or foil webs which lie over one another can be embossed at the same time, preferably with a single pair of embossing rollers, which embosses all the webs lying over one another at the same time. A common structuring or embossing process of this nature, dispensing with a multiple number of pairs of embossing rollers, is correspondingly cost effective. In addition, an embossing pattern can very easily be changed by changing the pair of embossing rollers for a pair with a different embossing pattern. In particular, foil webs with a large number of different embossed patterns can be created very easily.

The process as defined in the invention allows foil webs which are lying on top of one another to be stacked with the embossed pattern offset or mismatched. In a further development of the process as described in the invention, the length of the individual routes taken by the foil webs in the area of the conveying device are set differently. In this way a different displacement of the embossed pattern can be achieved and the foil webs can be stacked in the desired manner.

The device described in the invention for creating a stack includes a feed device, a pair of embossing rollers, a conveying device and a stacking device. With this device, unembossed foil webs are fed to the pair of embossing rollers by the feed device. The foil webs thus supplied are embossed by the pair of embossing rollers in the desired way. According to the invention, the embossing rollers are structured in such a way that the foil webs are provided with a large number of knobs, so that these knobs have a draped or folded type structure. In a preferred further development of these embossing rollers, these are structured in such a way that the foil webs are provided with fissures when being embossed.

In a further design for this device, the first embossing roller has two different embossing patterns in the circumferential direction. The second embossing roller, which forms the pair of embossing rollers together with the first embossing roller, is designed to be opposed to the first embossing roller, so that the foil webs embossed in this way have alternately a first and then a second embossed pattern in the conveying direction.

In a preferred design the offset of the embossed pattern of the individually embossed foil webs is selected in such a way that two sheets arranged next to one another in the stack have a different embossed pattern, which means that the first embossed pattern of the one sheet comes to lie on the second embossed pattern of the other sheet.

With the device as defined in the invention, the embossing rollers are designed in such a way that through the embossing process in the flank area of the individual deformations, in particular knobs, the foil web obtains a draped or folded type structure. This draped or folded type structure in the individual knob flanks leads to a higher compression resistance for the individual knobs and the entire sheet material has greater bending strength. The reinforcement thus created also allows thinner foils to be used to achieve similar physical effectiveness, such as is achieved with known flat materials. Furthermore, the increased overall strength due to the draped or folded structure allows the manufacture of larger components without having to use an additional carrier or support metal sheet.

The stack as defined in the invention has a number of embossed sheets. These sheets are cut from the foil webs embossed and stacked in a mismatched fashion as described in the invention. An essential feature of this stack is that neighbouring foil webs have a different or offset embossed pattern. A further feature of the stack created according to the invention is that the embossed pattern has a large number of deformation with a draped or folded type structure. A preferred further design for this stack has fissured sheets.

BRIEF DESCRIPTION OF THE DRAWINGS

The invention is described in the following using design examples and with the aid of illustrations, as follows.

DETAILED DESCRIPTION OF A PREFERRED EMBODIMENT

Figure 1:
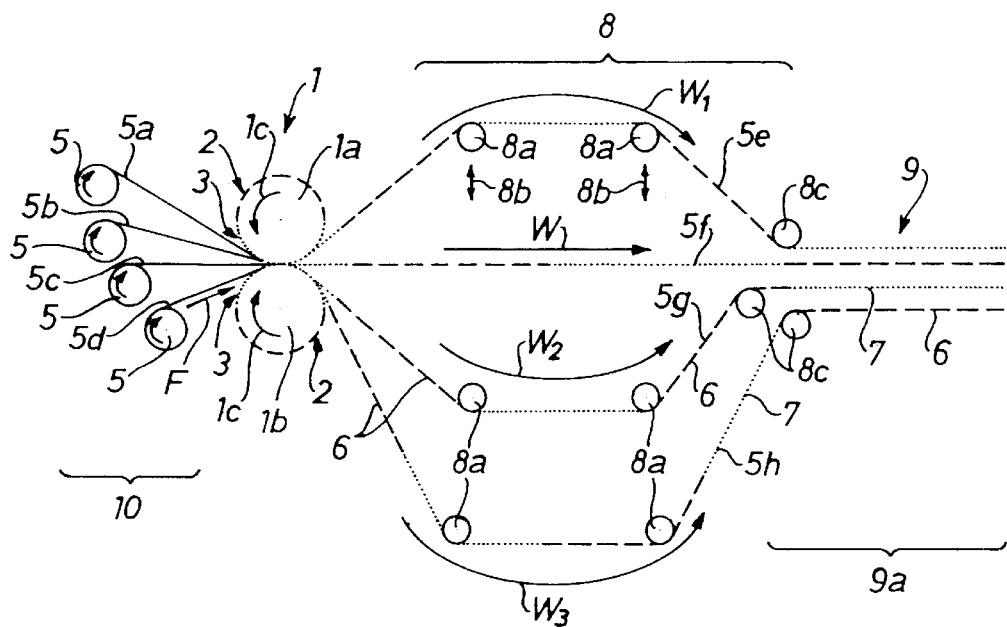
FIG. 1 : Shows a schematic representation of a device for the manufacture of a foil stack as defined in the invention.

The device shown in FIG. 1 includes a feed device 10, in which are arranged four rollers 5 placed over one another with rolled-on foil webs 5a, 5b, 5c, 5d. These foil webs 5a, 5b, 5c, 5d are drawn from the rollers 5 running in the conveying direction F and are fed lying over one another to the pair of embossing rollers 1. The pair of embossing rollers 1 consists of a first embossing roller 1a and a second embossing roller 1b, which are both positioned so as to be rotational in one direction of rotation 1c. The first embossing roller 1a is designed in such a way that the surface has a first structure 2 over 180° in the circumferential direction and then a second structure 3 over the further 180°. The second embossing roller 1b is structured to be opposed in relation to the first embossing roller 1a, in order to form the first structure 2 and the second structure 3. The webs 5a, 5b, 5c, 5d which lie over one another are embossed at the same time, by being structured at the same time by the pair of embossing rollers 1, so that embossed webs 5e, 5f, 5g, 5h are formed. These webs 5e, 5f, 5g, 5h, conditioned by the design of the pair of embossing rollers 1, have alternately a first embossed pattern 6 and a second embossed pattern 7. A device 8 is arranged after the pair of embossing rollers 1 for extending the conveying routes. This device 8 allows the webs 5e, 5f, 5g, 5h to be conveyed along routes of differing lengths W, W1, W2, W3, whereby the web 5f is conveyed a-long the shortest route W, whilst the webs 5e, 5g, 5h are conveyed along extended routes W1, W2, W3. The additional distance as compared with the shortest route W is determined by the position of the deflection rollers 8a. These deflection rollers 8 can be permanently fixed or can be adjusted by means of an adjusting device (not shown), for example in the direction of movement 8b. The individual webs 5e, 5f, 5g, 5h are fed to the stacking device 9a with the aid of the deflection rollers 8c forming a stack 9.

Figure 2:
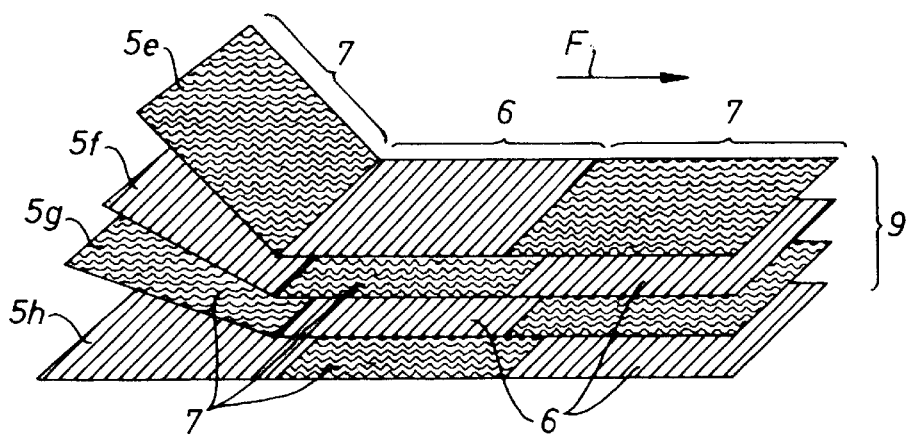
FIG. 2 : Shows a schematic representation of a stack as defined in the invention.

In the practical example shown the extended conveying routes W1, W2, W3 are selected in relation to the shortest conveying route W in such a way that the webs 5e, 5f, 5g, 5h come to lie on top of one another in the stack 9, as shown in FIG. 2, in such a way that two webs 5e, 5f, 5g, 5h arranged next to one another come to lie on top of one another with parallel displaced embossed patterns 6, 7.

A different selection of the offset of webs 5e, 5f, 5g, 5h can be also made by the corresponding choice of extended conveying routes W1, W2, W3 or the position of the deflection rollers 8a.

Figure 3:
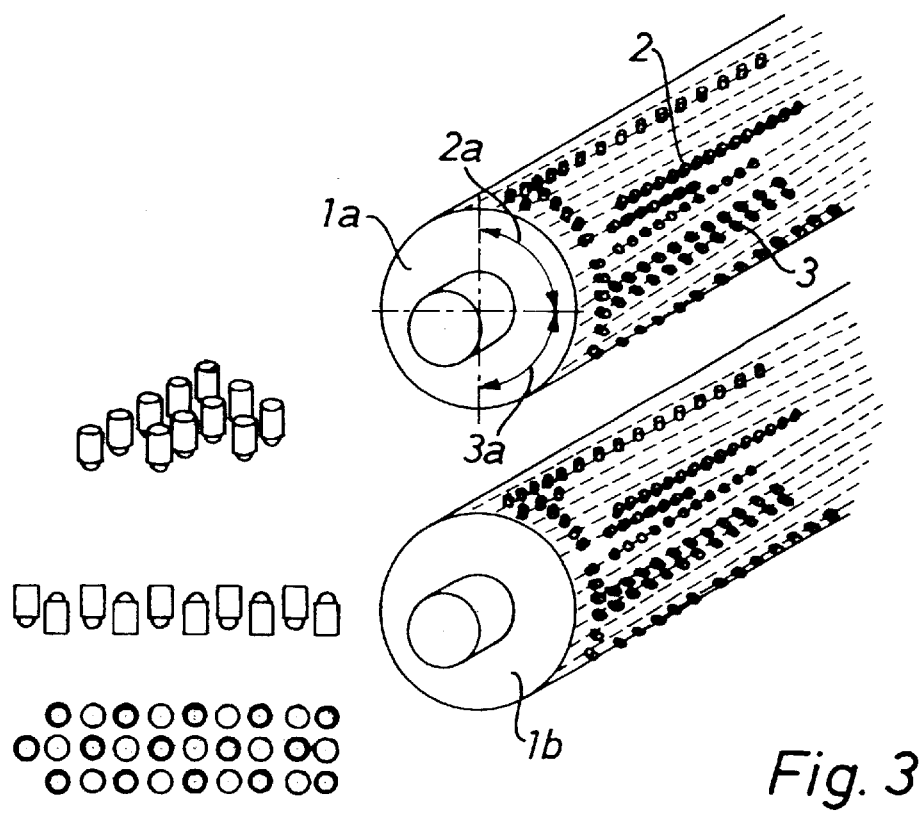
FIG. 3 Shows a special practical example of a pair of embossing rollers.

FIG. 3 shows a special design form of a pair of embossing rollers 1a, 1b. The surface of the embossing roller 1a is structured in such a way that it has a first knob arrangement 2 in the circumferential direction over a length 2a of 90° and then a second knob arrangement 3 over a length 3a of 90°, whereby the arrangements 2, 3 are again repeated. The embossing roller 1b is structured to be opposed to the surface of embossing roller 1a.

The embossing roller 1a can also have only a first knob arrangement 2 over the whole circumference. The structuring of the webs 5e, 5f, 5g and 5h achieved thereby can be carried out in such a way that elevations and depressions are formed, whereby the webs 5e, 5fg, 5g, 5h are brought together in an offset manner in the conveying direction F to form a stack 9, so that the depressions of an upper web 5e lie on the elevations of the lower web 5f. In this way, too, a stack 9 can be created with the webs 5e, 5f, 5g, 5h . In a further practical example the structure formed on the whole circumference of the embossing roller 1a can be continuously variable, so that foils arranged on top of one another in an offset fashion do not have the same embossed pattern.

Figure 4:
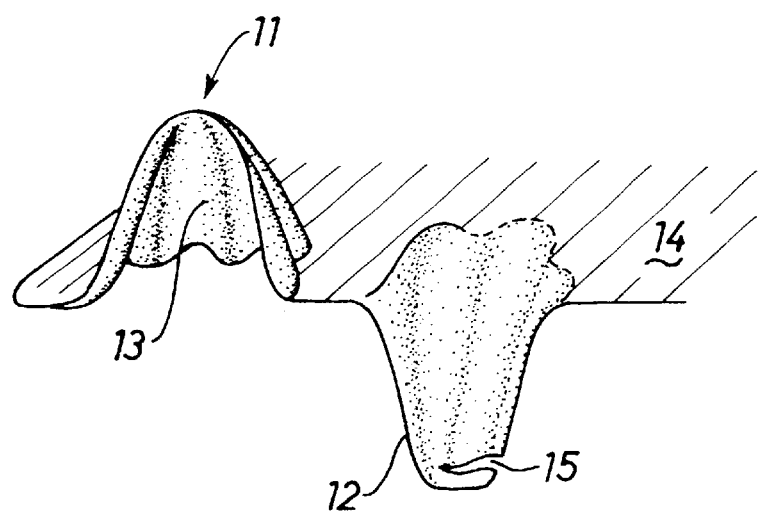
FIG. 4 Shows a detailed representation of individual knobs.

FIG. 4 shows the formation of the individual knobs 11. These knobs have a steep flank 12 and have the draped or folded structure 13 created with this process. This draped or folded structure 13 results when the sheet material 14 is stretched to the area of its irreversible apparent limit of elasticity. Of course, this apparent limit of elasticity can also be exceeded, in such a way that acoustically effective fissures result. A heat shield with fissured sheets is described in PCT/CH99/00058 (not yet published). The information contained in this document is to be included here in full.

A person skilled in the art will structure the knobs and their arrangement to the acoustic and thermal requirements without any further inventive activity.

Of course, these knobs can be arranged regularly or irregularly. Embossing is carried out with a correspondingly designed pair of embossing rollers. The embossed foil webs are brought together into a stack and not only lie in an offset fashion, but it is also certain that there will be a distance between the layers.

The first embossing roller can also have more than two different embossing patterns in the circumferential direction, for example three embossing patterns. The first embossing roller can also have two different embossing patterns in the circumferential direction, which only extend over part of the embossing roller and are arranged in the circumferential direction so as to be repeated several times.

The advantages of this invention are directly visible to the person skilled in the art and are especially to be seen in the considerable simplification of the manufacturing process and in the possibility of being able to make an easy and flexible choice of the desired acoustic and thermal characteristics. For instance, for the manufacture of acoustically effective heat shields a device can be used with which only one pair of embossing rollers is needed. In this way a change in the embossing pattern or the maintenance of this device is made considerably easier. Furthermore, targeted overexpansion of the foil web to be embossed can easily be achieved in order to obtain the desired draped or folded structure (reinforcement) and/or fissure formation (sound absorption).

| INDEX OF PARTS OF THE PREFERRED EMBODIMENT | |
| --- | --- |
| 1 | Pair of embossing rollers |
| 1a | Embossing roller |
| 1b | Embossing roller |
| 1c | Direction of rotation of the embossing rollers |
| 2 | First structure, embossing, knob embossing |
| 2a | Length of the first structure in the circumferential direction |
| 3 | Second structure, embossing, knob embossing |
| 3a | Length of the second structure in the circumferential direction |
| 5 | Rolls of webs made of flat or sheet material |
| 5a, 5b, 5c, 5d | Unembossed foil webs |
| 5e, 5f, 5g, 5h | Embossed foil webs |
| 6 | First embossing pattern |
| 7 | Second embossing pattern |
| 8 | Conveying device |
| 8a | Deflection rollers |
| 8b | Adjustment device for the deflection rollers |
| 9 | Stack |
| 9a | Stacking device |
| 10 | Feed device |
| F | Conveying direction |
| W | Shortest conveying route |
| W1, W2, W3 | Different conveying routes |

Whilst the invention has been described and illustrated by way of preferred embodiments of the invention, it will be understood to those skilled in the art that various changes in form and detail may be made without departing from the spirit and scope of the invention as defined in the appended claims.

What is claimed is:

1. A method of manufacturing a stack made of embossed foils webs for a vehicle heat shield, where at least two unembossed foil webs are conveyed from a feed device in a conveying direction and are embossed between at least one pair of embossing rollers, and the embossed foil webs are then brought together to form a stack in a stacking device wherein the embossed foil webs arranged next to one another are conveyed along different conveying routes with the aid of a conveying device whereby at least two embossed foil webs arranged next to one another in the stack are offset in the conveying direction due to the differences in length of the various conveying routes.

2. A method as defined in claim 1, wherein the unembossed foil webs lying over one another are embossed by a single pair of embossing rollers.

3. A method as defined in claim 1, wherein the unembossed foil webs lying on top of one another are embossed with at least two different embossing patterns, including a first embossing pattern and a second embossing pattern.

4. A method as defined in claim 3, wherein the first and second embossing patterns in the conveying direction are essentially structured to be of the same length, and wherein the embossed foil webs are guided along different length conveying routes in such a way that two foil webs arranged next to one another in the stack have different embossed patterns.

5. A method as defined in claim 1, wherein the unembossed foil webs lying on top of one another are over-stretched in a targeted way during embossing, so that the embossed foil webs are provided with deformations with a draped or folded structure.

6. A method as defined in claim 1, wherein the at least two unembossed foil webs are knobbed between the at least one pair of embossing rollers.

7. A method as defined in claim 5, wherein the embossed foil webs are provided with knobs.

8. A method as defined in claim 5, wherein fissures are created.

9. A device for manufacturing a stack made of embossed foil webs for a vehicle heat shield, the device including a feed device for several unembossed foil webs at least one pair of embossing rollers arranged to follow the feed device in a conveying direction for embossing the unembossed foil webs which are arranged to lie over one another, and a stacking device arranged to follow this, for bringing together the embossed foil webs, wherein a conveying device is arranged between the at least one pair of embossing rollers and the stacking device, for creating different length routes for the individual embossed foil webs, whereby due to the length differences of the various conveying routes the embossed foil webs arranged next to one another are offset in the conveying direction.

10. A device as defined in claim 9, wherein at least one embossing roller of the pair of embossing rollers has at least a first embossing pattern and a second embossing pattern.

* * * * *